United States Patent [19]

Gelder

[11] Patent Number: 4,963,068

[45] Date of Patent: Oct. 16, 1990

[54] TRAILER RESTRAINT

[75] Inventor: Kenneth M. Gelder, West Bend, Wis.

[73] Assignee: Systems, Inc., Germantown, Wis.

[21] Appl. No.: 300,133

[22] Filed: Jan. 23, 1989

[51] Int. Cl.$^5$ .............................................. B65G 69/22
[52] U.S. Cl. ................................. 414/401; 187/8.65; 414/584
[58] Field of Search ...................... 414/396, 401, 584; 187/8.65, 8.77

[56] References Cited

U.S. PATENT DOCUMENTS

| | | | |
|---|---|---|---|
| 4,472,099 | 9/1984 | Hahn et al. | 414/401 |
| 4,560,315 | 12/1985 | Hahn | 414/401 |
| 4,830,563 | 5/1989 | Yeakle | 414/401 |

Primary Examiner—H. Grant Skaggs
Assistant Examiner—Keith L. Dixon
Attorney, Agent, or Firm—Fuller, Ryan & Hohenfeldt

[57] ABSTRACT

A trailer restraint positively restrains a trailer against a dock by means of the trailer ICC bar. The trailer restraint is self-aligning with an ICC bar located anywhere within its range of operation. The trailer restraint comprises a shoe that pivots on a trunnion shaft within a housing located under the trailer ICC bar. The trunnion shaft is slidable within the housing against a strong spring. A hydraulically operated slider advances to pivot the shoe until a working surface thereof contacts the trailer ICC bar. Further advancement of the slider causes the shoe to pivot about the contact point of the shoe on the ICC bar, thereby sliding the trunnion shaft until the shoe working surface is aligned with the trailer ICC bar. A lock bar received on the trunnion shaft slides therewith. A pawl engages teeth on the lock bar to prevent further sliding of the lock bar and trunnion shaft. Various switches sense the location of the shoe and lock bar and are incorporated into an electrical circuit to display the status of the trailer restraint to nearby personnel.

30 Claims, 4 Drawing Sheets

TRAILER RESTRAINT

BACKGROUND OF THE INVENTION

1. Field of the Invention.

This invention pertains to restraining devices, and more particularly to apparatus for restraining large movable objects against a fixed structure.

2. Description of the Prior Art.

Various equipment has been developed to restrain large vehicles such as trucks and trailers against loading docks. Such restraining devices are highly desirable from the safety standpoint, because unrestrained vehicles can roll relative to the dock and thereby render them hazardous to load and unload. Although inexpensive and simple to use, wheel chocks are generally ineffective for restraining a vehicle safely in place. Some prior restraining equipment coacts with a bumper, known as an ICC bar, that is required on most large trucks and semi-trailers. Examples of such equipment include the Powerhook II restraint manufactured by Systems, Inc., of Germantown, Wisconsin. In that design, a large hook is normally recessed in a protected location within the loading dock face. With a trailer at the dock, a hydraulic system operates to extend the hook horizontally under the ICC bar, raise the hook until it contacts the underside of the ICC bar, and then retract the hook horizontally back toward the dock face until the hook engages the ICC bar. Continuous hydraulic pressure maintains a strong force for holding the trailer firmly against the dock. A somewhat similar restraint is manufactured by T & S Equipment Company of Angola, Indiana, under Model No. TL-100. Both of the aforementioned restraint systems are handicapped in that they are mounted within the loading dock foundation. Therefore, retrofit installation after the loading dock has been constructed is difficult and costly.

U.S. Pat. Nos. 4,208,161; 4,281,621; 4,373,847; and 4,553,895 describe manually operated devices for releasably securing a vehicle to an adjacent support by means of the vehicle ICC bar. The devices of those four patents suffer the disadvantage of being able to successfully restrain a vehicle only if the ICC bar is located within a very narrow range of positions relative to the dock. If the ICC bar is outside of that small range, such as through damage, the restraining devices of the foregoing four patents will either be unable to properly engage the ICC bar, or they will allow clearance to exist between the restraining member and the ICC bar through which the vehicle can roll.

The T & S Equipment Company manufactures a Model TL-100-F vehicle restraining device that anchors to the floor of the dock approach. A hydraulic cylinder in a housing actuates a rotating arm and raiseable platform that is engageable with a trailer ICC bar. While that T & S Equipment Company device can accommodate different locations of an ICC bar, it is undesirably expensive and complicated.

U.S. Pat. No. 4,630,989 discloses a power actuated restraint system in which a pivotal bar member can be swung upwardly so as to capture the ICC bar between the pivotal bar member and the loading dock. However, with the system of the 4,630,989 patent, a clearance exists between the ICC bar and the restraint pivotable bar member. The vehicle can roll through that clearance before the bar member actually restrains the vehicle.

Thus, a need exists for a restraining system that accommodates a variety of vehicles to hold them in place without rolling against a stationary structure.

SUMMARY OF THE INVENTION

In accordance with the present invention, a non-impact self-aligning trailer restraint is provided that securely restrains a wide variety of vehicles to a loading platform in a safe and reliable manner. This is accomplished by apparatus that includes a shoe that pivots within a housing about a slidable trunnion shaft between raised and closed positions.

In the closed position, the shoe is nested within the housing, which is fixed to the loading dock face under the loading platform. In the closed position, a first working surface of the shoe is generally horizontal, and a second working surface depends generally vertically from the first working surface. With the shoe in the closed position, the trailer restraint is in an inoperative configuration, and a vehicle can be driven over the trailer restraint and parked against the dock.

The trunnion shaft passes through the shoe near the junction of the two working surfaces thereof. The ends of the trunnion shaft are received in a track in the housing for sliding toward and away from the dock base. A very strong spring biases the trunnion shaft backwardly toward the dock face.

A hydraulic cylinder is employed to pivot the shoe between the closed and raised positions. The hydraulic cylinder advances forwardly away from the dock face and acts through a slider that slidingly bears against the shoe second working surface at a first lever arm distance from the trunnion shaft. At a position intermediate the closed and raised positions, the shoe first working surface contacts the ICC bar of the vehicle parked over the trailer restraint. As a result, a second lever arm is created, which extends between the point of contact of the shoe first working surface with the ICC bar and the bearing point of the slider on the shoe second working surface. Further advancement of the cylinder and slider against the shoe second working surface pivots the shoe about the point of contact of the shoe with the ICC bar. Simultaneously, the trunnion shaft is forced forwardly in the housing tracks. The strong spring resists the trunnion shaft movement, and therefore sets up a backward force on the shoe contact point with the ICC bar to force the vehicle backwardly against the dock. As the cylinder continues to advance the slider to slidingly bear against the shoe second working surface, the shoe continues to pivot and the trunnion shaft continues to slide forwardly until the shoe first working surface is aligned with the ICC bar. At that point, the slider passes alongside the shoe second working surface and holds the shoe from returning to the nested position.

The sliding trunnion shaft design enables the shoe to be self-aligning with ICC bars within a wide range of locations relative to the trailer restraint. The effect of different locations of the ICC bar is merely to cause the shoe to pivot through greater or lesser angles before the first working surface thereof makes initial contact with the ICC bar. Similarly, varying locations of the ICC bar causes varying sliding distances of the trunnion shaft until the shoe is aligned with the ICC bar.

To positively restrain the vehicle against the dock by means of the raised shoe, the present invention includes a lock bar acting between the shoe and the housing. In the preferred embodiment, the lock bar is joined to the trunnion shaft for sliding therewith within the housing as the shoe is pivoted to the raised position. With the shoe in the raised position, a pawl engages teeth on the lock bar to prevent further sliding of the trunnion shaft. The pawl is actuated to engage the lock bar teeth by an arm that is contacted by the slider as the slider passes alongside the shoe second working surface at the end of its stroke. Until the slider contacts the arm, the pawl is disengaged from the lock bar teeth. Thus, with the shoe in the raised position and the lock bar slid forwardly in unison with the trunnion shaft, the trailer restraint is in an operative configuration to positively restrain the vehicle without clearance against the dock.

To determine that the trailer restraint has attained the operative configuration, the present invention includes a warning system. The warning system is designed to indicate that the vehicle ICC bar has indeed been bound and restrained. A warning system is required because it is possible for the trailer restraint to be operated to pivot the shoe to the raised position without a vehicle parked at the dock. The trailer restraint can also be operated with a parked vehicle that does not have an ICC bar or that has an ICC bar that is out of the range of the trailer restraint. To assure that the operating personnel are aware of the operative status of the trailer restraint, the warning system is designed such that merely raising the shoe does not signal that a vehicle is restrained in place. The warning system comprises a series of signals that are operated by a control circuit. The control circuit includes a proximity switch that senses when the shoe has attained a raised position. A second proximity switch senses the presence of the lock bar after it has slid with the trunnion shaft within the housing for a predetermined distance from its location when the shoe is in the closed position. Since the trunnion shaft does not slide within the housing unless forced to do so by the slider acting through the lever arm between the slider and the contact point of the shoe first working surface with the ICC bar, the warning system will signal an operative configuration only if the shoe has found the ICC bar. The combination of the first and second proximity switches assures that no false signals are given that the trailer restraint is in an operative configuration.

When the vehicle has been loaded or unloaded at the dock, the trailer restraint is operated to return it to the inoperative configuration. The hydraulic cylinder withdraws backwardly toward the dock face to release the pawl from engagement with the lock bar teeth. Continued withdrawal causes the slider to pass from being alongside the shoe second working surface. The spring acts against the trunnion shaft to slide it toward its location when the shoe is nested in the housing. Sliding the trunnion shaft causes the lock bar to slide away from the second proximity switch. The warning system circuit signals that the trailer restraint is in the inoperative configuration. The combination of the forces provided by the ICC bar on the shoe first working surface and the spring on the trunnion shaft causes the shoe to pivot toward the closed position until the shoe breaks contact with the ICC bar. Thereafter, gravity causes the shoe to fully close. A third proximity switch in the warning system senses that the shoe is in the closed position.

Other objects and advantages of the invention will become apparent to those skilled in the art upon reading the disclosure.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 3:
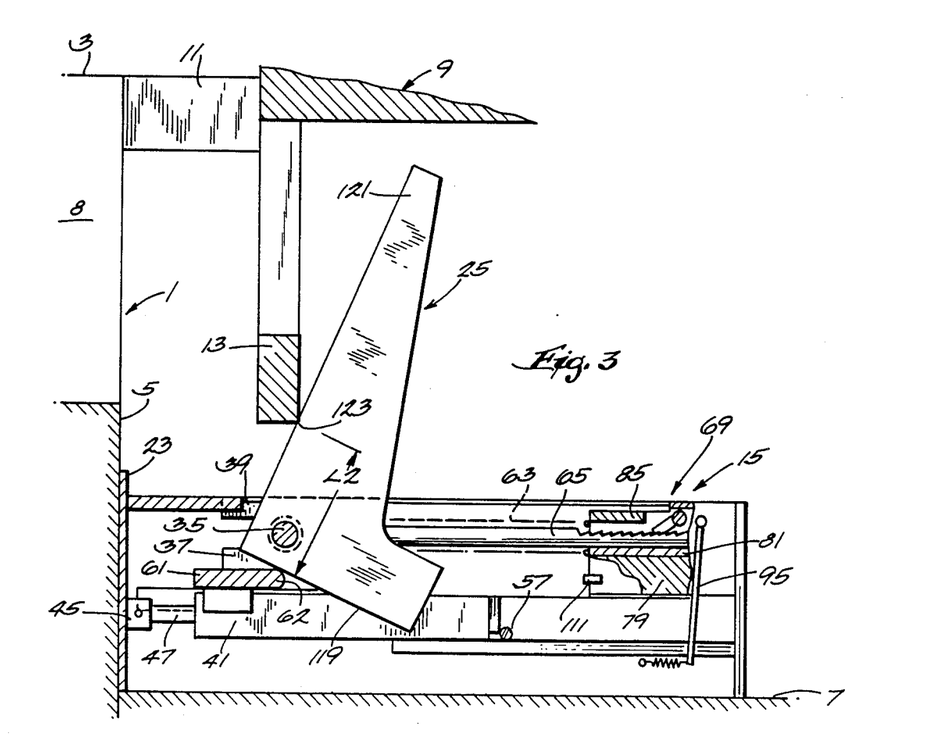
FIG. 3 is a partially broken cross sectional view on a reduced scale similar to FIG. 2 but showing the trailer restraint in a configuration intermediate an inoperative configuration and an operative configuration.

Referring first to FIG. 3, reference numeral 1 indicates a dock at which trailers and other vehicles can be loaded and unloaded. The dock 1 comprises a loading platform 3, a vertical face 5, and a floor 7, as are known in the art. The dock may be formed with a pit 8 for receiving dock leveling equipment, not shown, which does not constitute any part of the present invention. Reference numeral 11 represents a conventional bumper permanently attached to the dock face 5. A typical vehicle to be loaded or unloaded is represented by a trailer 9, which is driven along the floor 7 to place the loading doors conveniently adjacent the platform 3. In compliance with federal transportation regulations, the trailer 9 includes a horizontal bumper 13 that is located a predetermined distance above the floor 7. The bumper 13 is commonly referred to as an ICC bar.

Apparatus

In accordance with the present invention, a trailer restraint 15 is provided that positively restrains the trailer 9 against the dock 1 without clearance. Such positive restraint is necessary for safely loading and unloading the trailer from the dock platform 3. Looking also at FIGS. 1 and 2, the trailer restraint 15 comprises a housing 17 that includes a pair of longitudinally extending side walls 19, a front wall 21 and a back wall 23. The housing 17 preferably rests on the floor 7. The back wall 23 is securely fixed to the dock face, as by anchor bolts 25. If desired, the housing can also be secured to the floor, such as by feet formed on the side walls 19.

The trailer restraint 15 further comprises a shoe 25 that is mounted for pivoting and for sliding within the housing 17. The shoe 25 is preferably L-shaped, having a first pair of spaced relatively long legs 27 and a pair of spaced relatively shorter legs 29. The pairs of legs 27 and 29 are joined by respective cross plates 31 and 33. The shoe pivots relative to the housing by means of a trunnion shaft 35. Opposed ends of the trunnion shaft 35 are supported within tracks defined by two vertically spaced bars 37 and 39 welded or otherwise joined to the insides of the housing side walls 19. Also see FIG. 5.

To pivot the shoe 25 about the trunnion shaft 35, the trailer restraint 15 includes a hydraulic cylinder 41. One end of the cylinder 41 is fastened to the housing back plate 23, as by a clevis 43 secured to a pair of lugs 45. The clevis 43 may be connected to the cylinder piston rod 47. In the construction shown, the piston end of the cylinder is horizontally supported by a slider 49. A mounting plate 53 and a short spacer 55 are attached to the cylinder. A rod 57 is welded to the free end of the spacer 55. The ends of the rod 57 are supported on rails 59 welded to the housing side walls 19. Mounted to the back end of the mounting plate 53 is a slider plate 61. The front edge 62 of the slider plate 61 is preferably rounded.

The trunnion shaft 35 is biased to a first location toward the back of the housing 17 by a strong spring 63. In the illustrated embodiment, the spring 63 is fit over a lock bar 65. The back end of the lock bar 65 is attached to a trunnion sleeve 67 that is received over the trunnion shaft between the shoe legs 27 and 29. Accordingly, the back end of the spring bears against the trunnion sleeve 67 The front end of the spring bears against a latch weldment 69 that is fastened to the housing. The latch weldment 69 comprises a top piece 71 that is attached at its opposite ends to a pair of housing supports 73 by conventional fasteners 75. Depending from the top piece 71 are a pair of spaced side plates 77 and 78. The lower ends of the side plates 77 and 78 are joined by a spacer block 79, to the top of which is mounted a wear plate 81. Another spacer block 85 joins the side plates 77 and 78 near their respective upper ends. The front end of the lock bar 65 rides on the wear plate 81. Thus, the front end of the spring 63 bears against the back face 83 of the latch weldment side plates 77 and 78 and the spacer blocks 79 and 85 to bias the trunnion shaft and shoe 25 in the backward direction.

The front end of the lock bar 65 is formed with rack-like teeth 87. The teeth 87 are engageable with a pawl 89. The pawl 89 is joined to a rod 91 that is rotatably received within the latch plate side walls 77 and 78, with the pawl being between those side walls. One end 93 of the rod 91 extends out of the side plate 78. To the rod end 93 is fixed a short arm 94. Also mounted to the side plate 78 is a long arm 95. The long arm 95 is rotatably mounted at its upper end in the side plate 78, as by a screw 96. There is an adjustable connection 99 between the arms 94 and 95. The connection 99 may take the form of a screw 98 that is received in a nut 101. As depicted, the nut 101 is welded or otherwise fastened to the arm 94. A spring 97 is hooked between the free end of the arm 95 and a suitable point on the housing 17. The spring 97 biases the arm 95 to the position shown in FIG. 2 In that position, the screw and nut combination 99 acts on the short arm 94 such that the pawl 89 is disengaged from the lock bar teeth 87. The pawl is operated to engage the lock bar teeth in a manner that will be described presently.

Further in accordance with the present invention, a warning system operates in conjunction with the trailer restraint 15 to indicate to the truck driver and to personnel on the loading dock 1 of the operative status of the trailer restraint. Looking especially at FIG. 6, the warning system is shown at reference numeral 101 as a portion of a schematic electrical circuit 102 for controlling the operation of the trailer restraint.

Figure 6:
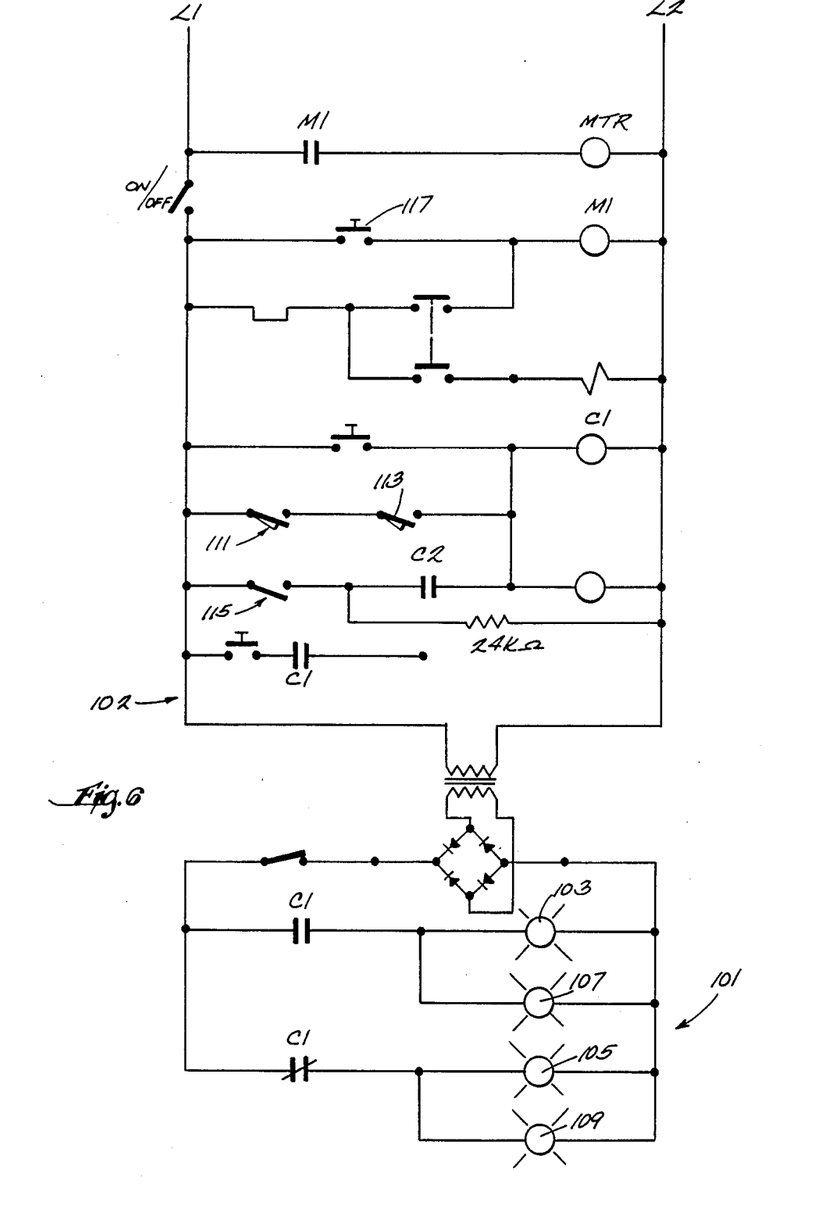
FIG. 6 is a schematic diagram of an electrical circuit for operating the trailer restraint of the present invention.

Warning system 101 comprises a pair of lamps 103 and 105 located outside the dock area 1, where they are visible to a driver of the trailer 9 but not to persons on the loading platform 3. The warning system also includes a pair of lamps 107 and 109 located adjacent the dock and visible to persons there but not to the truck driver. Lamps 103, 105, 107 and 109 may be flashing.

To operate the warning lamps 103, 105, 107 and 109, the circuit 102 comprises a normally open proximity switch 111 mounted to the latch weldment 69 in a position to be contacted by the long arm target 95. Also see FIGS. 1–4. A second normally open proximity switch 113 and a normally closed proximity switch 115 mounted to the latch weldment are also components of the warning system 101.

Operation

The operation of the trailer restraint 15 will be explained by initially assuming that the trailer restraint is in the inoperative configuration of FIGS. 1, 2, and 5. In that configuration, the shoe 25 is nested within the housing 17. The strong spring 63 acting between the latch weldment 69 and the trunnion sleeve 67 holds the trunnion shaft 35 at the location corresponding to the shoe closed position. The proximity switch 111 is open, FIG. 6. The front end of the lock bar 65 is located at a distance from the proximity switch 113 so as not to close that switch. The closed shoe is located at a position close enough to the proximity switch 115 so as to actuate that switch to the open condition. As a result of the foregoing switch conditions, the lamp 105 outside the dock and visible to the truck driver shows green, indicating to the driver that it is safe to back his trailer 9 over the trailer restraint 15. At the same time, the lamp 109 visible to personnel on the loading platform 3 shows red, which indicates that the trailer restraint is in the inoperative configuration and therefore it is not safe to load the trailer. The lamps 103 and 107 are not lit. The trailer having an ICC bar 13 is then backed to the dock 1 along floor 7 until the back end of the trailer contacts the dock bumper 11. The trailer is parked, and the wheels are chocked.

The circuit engage switch 117 is activated to pump fluid from a conventional hydraulic pump and circuit to cylinder 41 via conduits, not illustrated. The hydraulic cylinder advances from the housing back wall 23 such that the edge 62 of the slider 49 bears against the working surface 119 of the shoe leg 29. The slider plate 61 acts through a first lever arm L1 to force the shoe to pivot counterclockwise with respect to the drawings to raise the shoe. As the cylinder 41 advances, the slider plate 61 pivots the shoe 25 counterclockwise until the working surface 121 of the shoe longer legs 27 strikes the trailer ICC bar 13 at contact point 123. Until that shoe position has been reached, the trunnion shaft 35 does not move.

With the shoe working surface 121 in contact at point 123 with the ICC bar 13, continued advancement of the cylinder 41 and slider plate 61 produces a reaction force backwardly on the ICC bar to press the trailer 9 against the bumpers 11. That is because contact point 123 acts as a fulcrum for the shoe, with the slider plate 61 acting through lever arm L2 to pivot the shoe, force the trunnion shaft 35 to slide forwardly, and to compress the spring 63. Cylinder and slider plate advancement continue to pivot the shoe and slide the trunnion shaft 35 against the spring 63 until the shoe first working surface 121 is aligned with the ICC bar 13. At that point, the trunnion shaft 35 is at a second location along the housing, and the shoe is in the raised position. The second location of the trunnion shaft varies with the location of the ICC bar relative to the housing 17. Thus, the slidable trunnion shaft renders the trailer restraint self-aligning. After the shoe has attained the raised position, the slider plate 61 passes alongside the shoe surface 119 and has no further effect on the shoe or trunnion shaft. The shoe is maintained in the raised position by the presence of the slider plate alongside the shoe second working surface 119.

As the trunnion shaft 35 is forced by the slider plate 61 to slide along the housing bars 37 and 39 to the trunnion shaft second location corresponding to the shoe raised position, the trunnion sleeve 67 and lock bar 65 also slide toward the trailer restraint front end. The slider rod 57 of the advancing slider 49 strikes the long arm 95. The long arm is pivoted counterclockwise against the force of the spring 97. As a result, the short arm 94 and the pawl 87 fall by gravity. The pawl engages the teeth 87 of the lock bar 65. The pawl and lock bar cooperate to prevent the trunnion shaft 35, and thus the shoe 25 and the ICC bar 13, from moving away from the dock 1. Finally, the slider advances such that the long arm 95 targets the proximity switch 111. Suitable control circuitry, FIG. 6, stops the cylinder advancement. The trailer 9 is thus securely and positively restrained to the dock.

Figure 1:
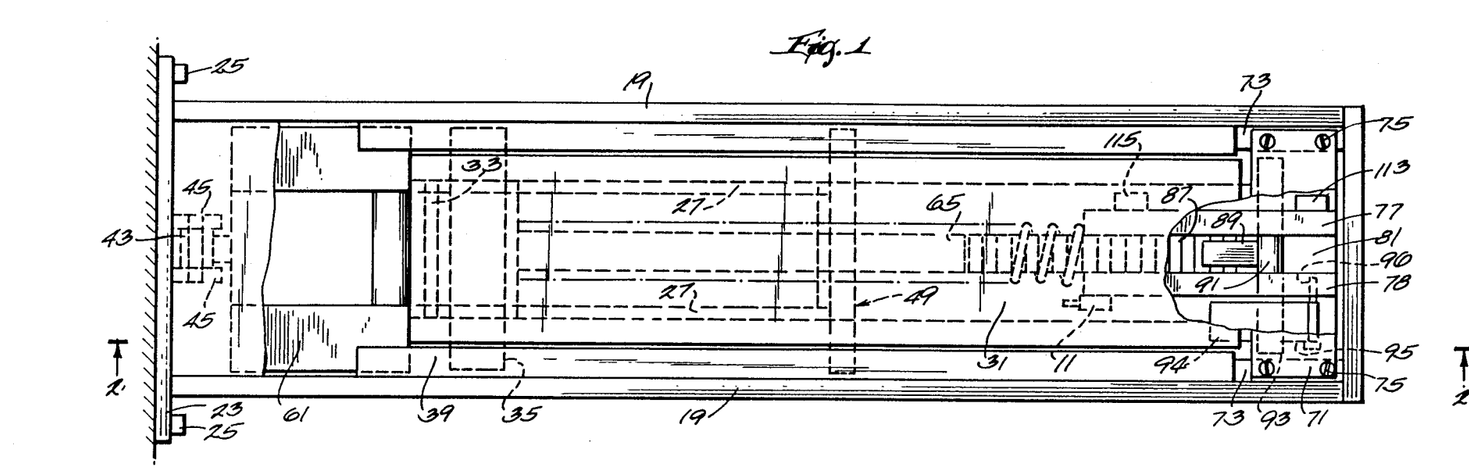
FIG. 1 is a partially broken top view of the trailer restraint of the present invention shown in the inoperative configuration.

The sliding of the trunnion shaft 35 causes the lock bar 65 to approach and close the proximity switch 113, FIG. 1. As shown in FIG. 6, closing the limit switch 111 at the end of the cylinder stroke when the proximity switch 113 is closed reverses the signal lamps 103, 105, 107 and 109 in the warning system 101. Lamps 105 and 109 are de-energized. Lamp 103, located outside of the dock 1 and in view of the truck driver, shows red. The driver is therefore warned that it is not safe to pull the trailer 9 from the dock. Simultaneously, lamp 107, which is located on the dock in view of personnel working on the loading platform 3, shows green. Lamp 107 thus signals that the trailer is restrained to the dock and it is safe to load or unload the trailer.

Figure 2:
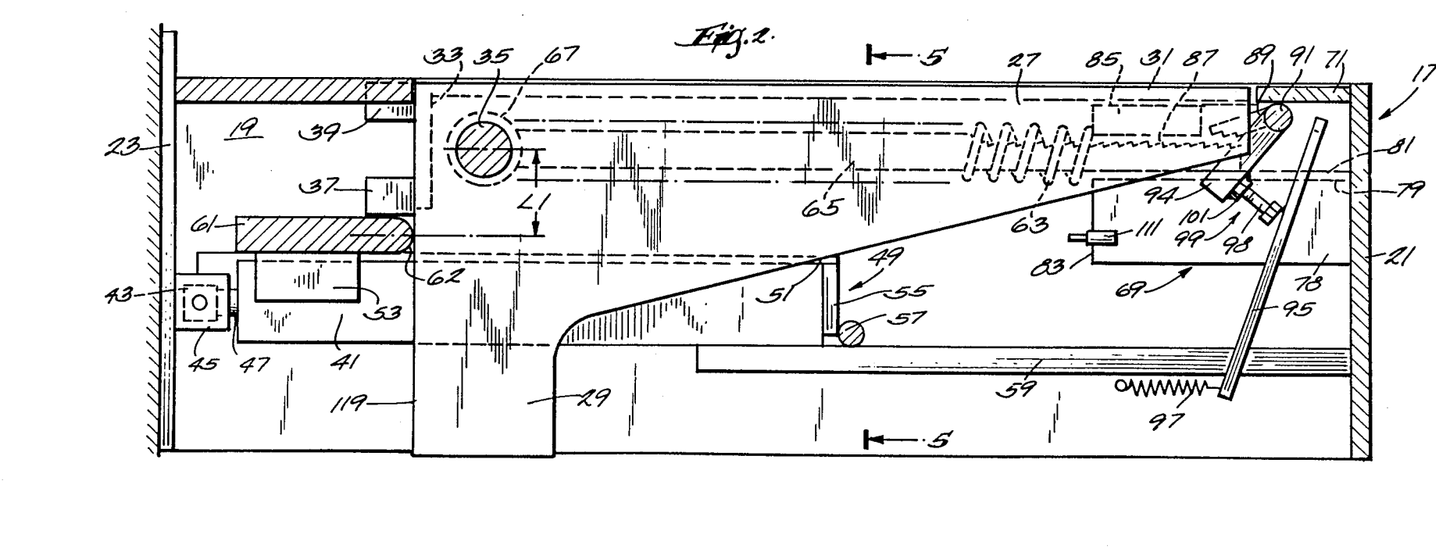
FIG. 2 is a cross sectional view taken along lines 2—2 of FIG. 1.
Figure 4:
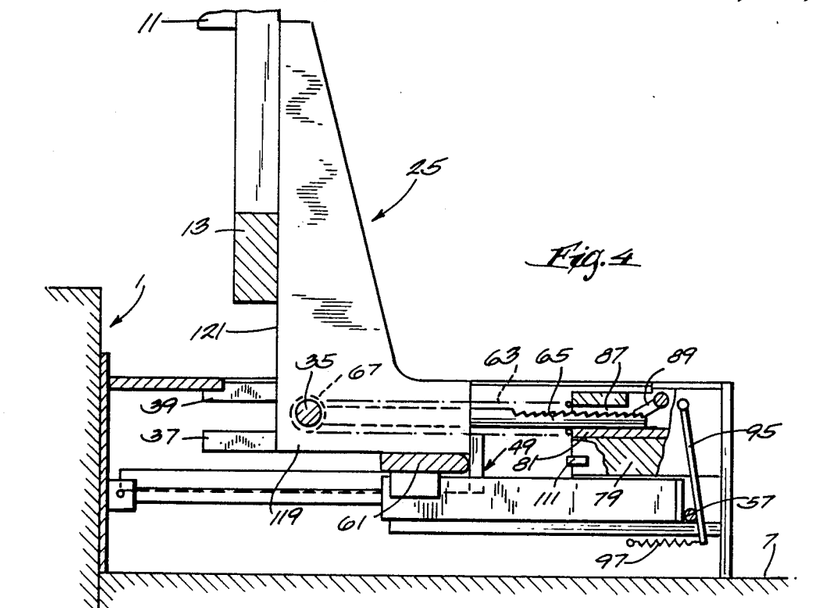
FIG. 4 is a view similar to FIG. 3 but showing the trailer restraint in the operative configuration.
Figure 5:
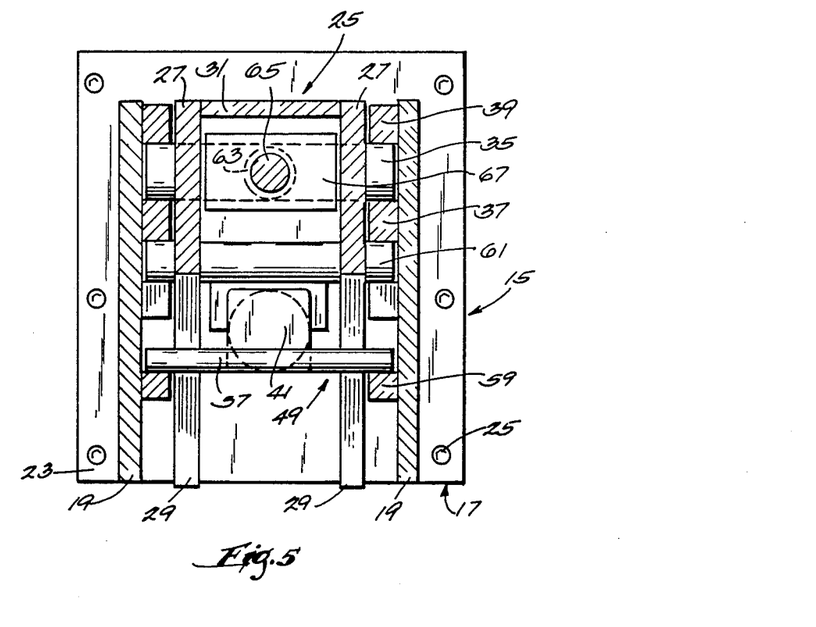
FIG. 5 is a cross sectional view taken along lines 5—5 of FIG. 2.

When the loading or unloading operations have been completed, the trailer restraint 15 is returned to the inoperative configuration of FIGS. 1, 2, and 5 from the operative configuration of FIG. 4. For that purpose, the hydraulic circuit controlling cylinder 41 is activated to retract the cylinder backwardly toward the dock 1. The cylinder and slider plate 61 retract the slider rod 57 from contact with the long arm 95. Therefore, the spring 97 biases the pawl 89 to disengage the lock bar teeth 87, as is shown in FIG. 3. Long arm 95 breaks contact with proximity switch 111. Therefore, proximity switch 111 opens with the lamps 103 and 107 remaining energized until proximity switch 115 opens, and lamps 105 and 109 are energized.

When the plate front edge 62 has retracted slightly past vertical alignment with the shoe working surface 121, the spring 63 slides the trunnion shaft 35 backwardly and simultaneously pivots the shoe 25 about its contact point 123 with the ICC bar 13. Continued retraction of the slider plate 61 plus the force from the spring result in full pivoting of the shoe about the sliding trunnion shaft to the lowered position of FIGS. 1, 2, and 5.

As the trunnion shaft slides backwardly while the shoe 25 is pivoting toward the closed position, the lock bar 65 also slides backwardly. After a short travel, it becomes sufficiently distant from the proximity switch 113 to open that switch, FIG. 6. Full closure of the shoe results in closing proximity switch 115.

It is a feature of the present invention that the warning system 101 operates to indicate whether or not the trailer restraint has found the trailer ICC bar 13 when the trailer restraint is operated. Actuating the engage switch 117 will cause the cylinder 41 to advance the slider 49 and pivot the shoe 25 to a raised position whether or not the shoe contacts an ICC bar. It is possible that the shoe does not find an ICC bar, either because the trailer 9 does not have one or because the ICC bar is out of the range of the trailer restraint shoe. In either case, the pivoting shoe will not contact the ICC bar, and no contact point such as point 123 will be created. Consequently, even though the shoe is in the raised position, the trailer restraint is not in a safe operative configuration. That is because the trunnion shaft 35 has not slid forwardly to have the lock bar teeth 87 engaged by the pawl 89. The lack of trunnion shaft and lock bar sliding is sensed by proximity switch 113, which does not close to cause the warning circuit 101 to energize the red lamp 103 or the green lamp 107. The truck driver and loading personnel are therefore warned by lamps 105 and 109 that a malfunction has occurred. If a trailer 9 is parked at the dock 1, the personnel are warned that the trailer should not be loaded or unloaded.

Thus, it is apparent that there has been provided, in accordance with the invention, a trailer restraint that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim:

1. Apparatus for restraining a movable member against a stationary member comprising:
   a. a housing fixed to the stationary member;
   b. shoe means for pivoting about the housing between a closed and a raised position and for linearly sliding within the housing between a first location and a second location, the shoe means being adapted to contact the movable member when in the raised position;
   c. means for locking the shoe means in place at the second location thereof within the housing when the shoe means is in the raised position;
   d. biasing means for resisting the sliding motion of the shoe means from the first to the second location within the housing; and
   e. means for pivoting and linearly sliding the shoe means within the housing.

2. The apparatus of claim 1 wherein the shoe means comprises:
   a. a trunnion shaft guided within and slidable within the housing;
   b. a shoe pivotally received on the trunnion shaft.

3. The apparatus of claim 2 wherein:
   a. the shoe is generally L-shaped having a first leg adapted to contact the movable member, and a second leg; and
   b. the means for pivoting the shoe and sliding the trunnion shaft comprises a slider plate received in the housing for bearing against the closed shoe second leg at first lever arm distance from the trunnion shaft to pivot the shoe about the trunnion shaft.

4. Apparatus for restraining a movable member against a stationary member comprising:
   a. a housing fixed to the stationary member;
   b. shoe means for pivoting about the housing between a closed and a raised position and for sliding along the housing between a first location and a second location, the shoe means being adapted to contact the movable member when in the raised position;
   c. means for locking the shoe means in place at the second location thereof within the housing when the shoe means is in the raised position, wherein the means for locking the shoe means comprises:
      i. an elongated lock bar having a first end connected to the shoe means and a second end that is slidable along the housing, the lock bar second end being formed with teeth; and
      ii. pawl means received in the housing for selectively engaging the lock bar teeth when the shoe means is in the raised position to thereby prevent sliding motion of the lock bar and shoe means along the housing;
   d. biasing means for resisting the sliding motion of the shoe means along the housing; and
   e. means for pivoting and sliding the shoe means along the housing.

5. The apparatus of claim 4 wherein the means for pivoting and sliding the shoe means comprises slider means slidingly received within the housing for actuating the pawl means into and out of engagement with the lock bar teeth.

6. The apparatus of claim 4 further comprising:
   a. first proximity switch means for sensing the raised position of the shoe means within the housing;
   b. second proximity switch means for sensing the location of the lock bar within the housing;
   c. third proximity switch means for sensing the closed position of the shoe means within the housing; and
   d. lamp means controlled by the third proximity switch means and the first and second proximity switch means for indicating the operative status of the shoe means and locking bar.

7. A self-aligning restraining device comprising:
   a. a housing having a front end and a back end;
   b. shoe means for linearly sliding and pivoting within the housing between a first position wherein the shoe means is nested within the housing and a second position wherein the shoe means restrains a second member from motion in the direction toward the housing front end and for sliding within the housing between a first location associated with the shoe means first pivotal position and a second location associated with the shoe means second pivotal position;
   c. slider means for advancing in the housing from the back end thereof toward the front end thereof to pivot and linearly slide the shoe means;
   d. biasing means for resisting the sliding of the shoe means from the first to the second locations thereof; and
   e. locking means for selectively preventing the sliding of the shoe means past the second location.

8. The restraining device of claim 7 wherein the shoe means comprises:
   a. a trunnion shaft received in the housing for sliding between the first and second locations; and
   b. a shoe pivotally retained on the trunnion shaft, the shoe having a first surface adapted to contact the selected member when the shoe is in a position intermediate the first and second positions thereof, and a second surface generally perpendicular to the first surface and adapted to be accosted by the slider means to pivot the shoe about the trunnion shaft between the first and second positions,
   so that advancing the slider means causes the slider means to bear against the shoe second surface and pivot the shoe toward the second position thereof.

9. The restraining device of claim 8 wherein the slider means comprises:
   a. a slider plate slidingly received in the housing for selectively bearing against the shoe second surface; and
   b. actuating means for selectively sliding the slider plate to bear against the shoe second surface at a predetermined distance from the trunnion shaft when the shoe is in the first position to thereby create a first lever arm therewith for pivoting the shoe about the trunnion shaft.

10. The restraining device of claim 8 wherein the biasing means comprises a spring interposed between the trunnion shaft and the housing front end to bias the trunnion shaft toward the housing back end.

11. A self-aligning restraining device comprising:
   a. a housing having a front end and a back end;
   b. shoe means for pivoting within the housing between a first position wherein the shoe means is nested within the housing and a second position wherein the shoe means restrains a second member from motion in the direction toward the housing front end and for sliding within the housing between a first location associated with the shoe means first pivotal position and a second location associated with the shoe means second pivotal position, wherein the shoe means comprises:
      i. a trunnion shaft received in the housing for sliding between the first and second locations; and
      ii. a shoe pivotally retained on the trunnion shaft, the shoe having a first surface adapted to contact the selected member when the shoe is in a position intermediate the first and second positions thereof, and a second surface generally perpendicular to the first surface and adapted to be accosted by the slider means to pivot the shoe about the trunnion shaft between the first and second positions;
   c. slider means for advancing in the housing from the back end thereof toward the front end thereof to pivot and slide the shoe means;
   d. biasing means for resisting the sliding of the shoe means from the first to the second locations thereof; and
   e. lock means for selectively preventing the sliding of the shoe means past the second location, wherein the lock means comprises:
      i. a lock bar operatively connected to the trunnion shaft for sliding therewith between the first and second locations thereof, the lock bar defining a plurality of teeth; and
      ii. pawl means selectively engaging and disengaging the lock bar teeth, the pawl means cooperating with the lock bar to prevent sliding of the lock bar and trunnion shaft along the housing beyond the trunnion means second location, so that advancing the slider means causes the slider means to bear against the shoe second surface and pivot the shoe toward the second position thereof.

12. The restraining deice of claim 11 wherein:
   a. the pawl means comprises:
      i. a pawl pivotally mounted to the housing; and
      ii. an arm fixed to the pawl for pivoting therewith; and
   b. the slider means comprises means for contacting the pawl arm to pivot the pawl into engagement with the lock bar teeth when the lock bar is slid with the trunnion shaft to the second location thereof.

13. The restraining device of claim 11 comprising:
   a. first switch means for sensing when the shoe is in the second pivotal position;
   b. second switch means for sensing when the lock bar is in the second location thereof;
   c. third switch means for sensing when the shoe is in the first pivotal position thereof; and
   d. circuit means for indicating the operative status of the restraining device in response to the shoe positions and lock bar location sensed by the first, second, and third switch means.

14. A trailer restraint for restraining a wheeled vehicle against a dock comprising:
   a. a housing adapted to be secured to the dock and to underlie a vehicle at the dock;
   b. a shoe received in the housing for pivoting between a first position wherein it is nested within the housing and a second position wherein a selected surface thereof is generally aligned with and bears against a selected vehicle component;
   c. trunnion means for pivotally supporting the shoe within the housing and for linearly sliding the shoe along the housing between a first location corresponding to the shoe first pivotal position and a second location corresponding to the shoe second pivotal position;
   d. actuator means for pivoting the shoe and for linearly sliding the trunnion means along the housing;
   e. means for biasing the trunnion means to the first location thereof; and
   f. lock means for selectively preventing trunnion means sliding along the housing beyond the second location thereof.

15. The trailer restraint of claim 14 wherein:
   a. the shoe is fabricated with a first surface adapted to contact the selected vehicle member when the shoe is pivoted toward the raised position and a second surface;
   b. the actuator means comprises slider means for advancing in the housing to bear against the shoe second surface to pivot the shoe about the trunnion means toward the raised position and to slide the trunnion means toward the second location thereof within the housing.

16. The trailer restraint of claim 15 wherein the slider means comprises:
   a. a plate for bearing against the shoe second surface when the shoe is in the first position and for passing alongside the shoe second surface when the shoe is in the second position; and
   b. rod means for actuating the lock means when the plate is advanced to pivot the shoe to the second position and to slide the trunnion means to the second location thereof.

17. A trailer restraint for restraining a wheeled vehicle against a dock comprising:
   a. a housing adapted to be secured to the dock and to underlie a vehicle at the dock;
   b. a shoe received in the housing for pivoting between a first position whereat it is nested within the housing and a second position whereat a selected surface thereof is generally aligned with and bears against a selected vehicle component;
   c. trunnion means for pivotally supporting the shoe within the housing and for sliding the shoe along the housing between a first location corresponding to the shoe first pivotal position and a second location corresponding to the shoe second pivotal position;
   d. actuator means for pivoting the shoe and for sliding the trunnion means along the housing;
   e. means for biasing the trunnion means to the first location thereof; and
   f. lock means for selectively preventing trunnion means sliding along the housing beyond the second location thereof, wherein the lock means comprises:
      i. a lock bar received on the trunnion means for sliding therewith along the housing, the lock bar defining a plurality of teeth; and
      ii. pawl means received in the housing for selectively engaging the lock bar teeth when the trunnion means is in the second location within the housing to thereby prevent sliding of the lock bar and trunnion means beyond the trunnion means second location.

18. The trailer restraint of claim 17 wherein the biasing means comprises a strong sprint interposed between the trunnion means and the housing.

19. A trailer restraint for restraining a wheeled vehicle against a dock comprising:
   a. a housing adapted to be secured to the dock and to underlie a vehicle at the dock;
   b. a shoe received in the housing for pivoting between a first position whereat it is nested within the housing and the second position whereat a selected surface thereof is generally aligned with and bears against a selected vehicle component;
   c. trunnion means for pivotally supporting the shoe within the housing and for sliding the shoe along the housing between a first location corresponding to the shoe first pivotal position and a second location corresponding to the shoe second pivotal position;
   d. actuator means for pivoting the shoe and for sliding the trunnion means along the housing;
   e. means for biasing the trunnion means to the first location thereof;
   f. lock means for selectively preventing trunnion means sliding along the housing beyond the second location thereof; and
   g. an electrical circuit for sensing the position of the shoe means and the location of the trunnion means comprising:
      i. a first proximity switch activated by the actuator means for sensing the second position of the shoe means;
      ii. a second proximity switch activated by the lock means for sensing the second location of the trunnion means; and iii. a third proximity switch activated by the shoe means for sensing the first position of the shoe means.

20. In combination with a loading dock; and a trailer having an ICC bar parked against the dock, a trailer restraint comprising:
   a. a housing fixed to the dock and underlying the trailer ICC bar;
   b. a shoe pivotally mounted in the housing, the shoe having first and second working surfaces;
   c. trunnion means for pivotally and slidingly supporting the shoe in the housing;
   d. actuator means for bearing against the shoe second working surface to pivot the shoe between a closed position wherein it is nested within the housing and a raised position wherein the first working surface thereof is aligned with and in firm contact with the trailer ICC bar, and for linearly sliding the trunnion means between a first location corresponding to the closed position of the shoe and a second location corresponding to the raised position of the shoe;
   e. biasing means for resisting the sliding of the trunnion means along the housing from the first to the second locations thereof; and
   f. lock means for preventing sliding of the trunnion means beyond the second location thereof.

21. The combination of claim 20 wherein the actuator means comprises:
   a. a slider advanceable within the housing to bear against the shoe second working surface to pivot the shoe about the trunnion means from the closed position to the raised position; and
   b. a rod attached to the slider and adapted to operate the lock means when the shoe is in the raised position, 22. The combination of claim 20 wherein the shoe first working surface contacts a trailer ICC bar at a contact point therebetween as the shoe is pivoted by the actuator means from the closed position toward the raised position, the actuator means acting through a lever arm extending between the ICC bar contact point and the bearing point of the actuator means with the shoe second working surface to pivot the shoe about the contact point and to slide the trunnion means along the housing from the first location thereof toward the second location thereof,
   so that the resistance of the biasing means on the trunnion means creates a reaction force at the ICC bar contact point to force the trailer against the dock.

23. The combination of claim 21 wherein the slider passes alongside the shoe second working surface whereat the shoe is in the raised position to thereby hold the shoe in the raised position.

24. The combination of claim 23 wherein:
   a. the actuator means is advanceable in the housing to pivot the shoe about the ICC bar contact point and slide trunnion means within the housing until the shoe first working surface is generally aligned with the trailer ICC bar;
   b. the trunnion means is at the second location thereof within the housing when the shoe first working surface is generally aligned with the trailer ICC bar; and
   c. the shoe is in the raised position when the shoe first working surface is aligned with the trailer ICC bar, so that the trailer restraint is self-aligning with the trailer ICC bar.

25. In combination with a loading dock; and a trailer having an ICC bar parked against the dock, a trailer restraint comprising:
   a. a housing fixed to the dock and underlying the trailer ICC bar;
   b. a shoe pivotally mounted in the housing, the shoe having first and second working surfaces;
   c. trunnion means for pivotally and slidingly supporting the shoe in the housing;
   d. actuator means for bearing against the shoe second working surface to pivot the shoe between a closed position whereat it is nested within the housing and a raised position whereat the first working surface thereof is aligned with and in firm contact with the trailer ICC bar, and for sliding the trunnion means between a first location corresponding to the closed position of the shoe and a second location corresponding to the raised position of the shoe;
   e. biasing means for resisting the sliding of the trunnion means along the housing from the first to the second locations thereof; and
   f. lock means for preventing sliding of the trunnion means beyond the second location thereof, wherein the lock means comprises:
      i. a lock bar received on the trunnion means for sliding therewith between corresponding first and second locations thereof, the lock bar being formed with teeth; and
      ii. pawl means received in the housing for rotating between an engaged position with the lock bar teeth and a disengaged position, the pawl means being rotated by the actuator means to engage the lock bar teeth when the lock bar is in the second location thereof.

26. In combination with a loading dock; and a trailer having an ICC bar parked against the dock, a trailer restraint comprising:
   a. a housing fixed to the dock and underlying the trailer ICC bar;
   b. a shoe pivotally mounted in the housing, the shoe having first and second working surfaces;
   c. trunnion means for pivotally and slidingly supporting the shoe in the housing;
   d. actuator means for bearing against the shoe second working surface to pivot the shoe between a closed position whereat it is nested within the housing and a raised position whereat the first working surface thereof is aligned with and in firm contact with the trailer ICC bar, and for sliding the trunnion means between a first location corresponding to the closed position of the shoe and a second location corresponding to the raised position of the shoe;
   e. biasing means for resisting the sliding of the trunnion means along the housing from the first to the second locations thereof;
   f. lock means for preventing sliding of the trunnion means beyond the second location thereof; and
   g. warning means for indicating to nearby personnel that the shoe first working surface is aligned with and in firm contact with the trailer ICC bar, wherein the warning means comprises:
      i. a first proximity switch activated by the actuator means for sensing that the shoe is in the raised position;

ii. a second proximity switch activated by the lock means for sensing that the trunnion means is in the second location thereof;

iii. a third proximity switch activated by the shoe for sensing that the shoe is in the closed position;

iv. lamp means controlled by the limit switch and first and second proximity switches for lighting in response to the shoe position and the trunnion location sensed thereby.

27. A method of restraining a trailer having an ICC bar against a dock comprising the steps of:

a. providing a housing underlying the trailer ICC bar;

b. providing a trunnion shaft and a shoe within the housing;

c. pivoting the shoe within the housing about the trunnion shaft until a working surface of the shoe contacts the trailer ICC bar;

d. simultaneously pivoting the shoe about the contact point thereof with the trailer ICC bar and sliding the trunnion shaft within the housing until the shoe working surface is aligned with the trailer ICC bar; and e. providing a resistance to the sliding of the trunnion shaft within the housing.

28. The method of claim 27 comprising the further step of locking the trunnion shaft against further sliding after the shoe working surface is aligned with the trailer ICC bar to thereby positively restrain., the trailer against the dock.

29. The method of claim 28 wherein the step of locking the trunnion shaft against further sliding comprises the steps of:

a. providing a toothed lock bar connected to the trunnion shaft; and b. locking the lock bar teeth against the housing to prevent sliding of the lock bar and the trunnion shaft.

30. The method of claim 27 comprising the further steps of:

a. sensing the pivotal position of the shoe within the housing;

b. sensing the sliding position of the trunnion shaft within the housing;

c. providing an electrical circuit with warning lamps; and d. engaging the warning lamps in accordance with the sensed position of the shoe and the sliding location of the trunnion shaft within the housing.

* * * * *